J. ELNIFF.
ANTI-WATER ADHESION EQUIPMENT FOR VESSELS.
APPLICATION FILED JUNE 1, 1917.
1,254,892.   Patented Jan. 29, 1918.
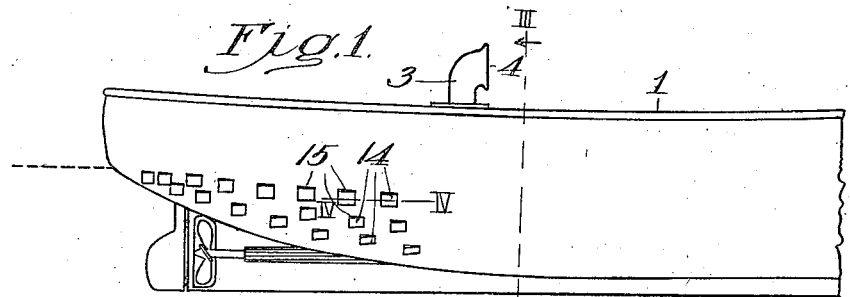
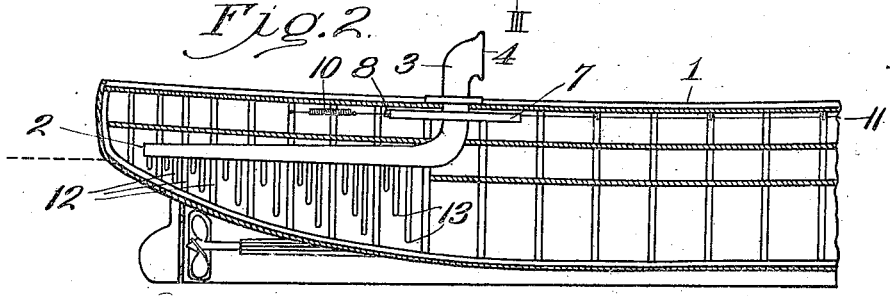
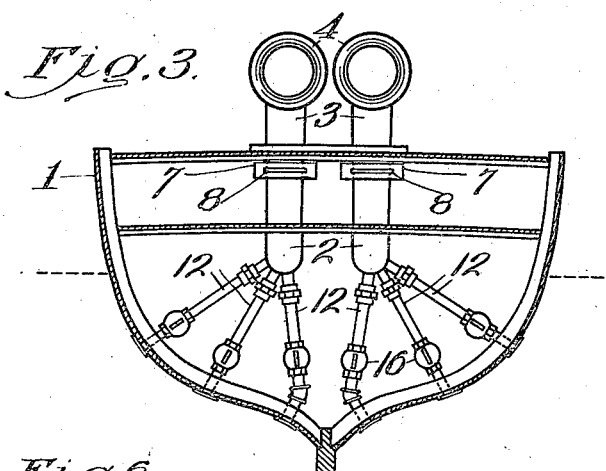
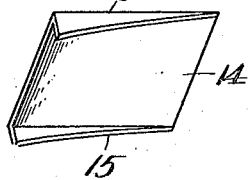
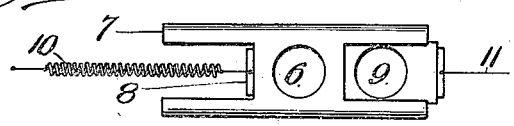
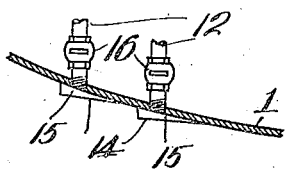
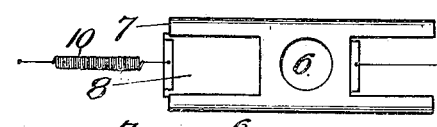
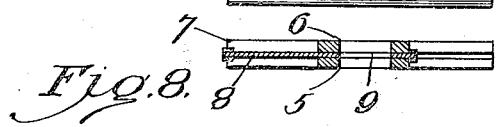
INVENTOR
John Elniff,
BY
George H. Thorpe
ATTORNEY

UNITED STATES PATENT OFFICE.

JOHN ELNIFF, OF KANSAS CITY, MISSOURI.

ANTI-WATER-ADHESION EQUIPMENT FOR VESSELS.

1,254,892.  Specification of Letters Patent.  Patented Jan. 29, 1918.

Application filed June 1, 1917. Serial No. 172,827.

*To all whom it may concern:*

Be it known that I, JOHN ELNIFF, a citizen of the United States, residing at Kansas City, in the county of Jackson and State of Missouri, have invented certain new and useful Improvements in Anti-Water-Adhesion Equipments for Vessels, of which the following is a specification.

This invention relates to vessels and my object is to produce an equipment for utilizing the relatively rapid flow of water at and near the stern of a vessel to produce suctional action which shall interpose a sheet of air between the rear part of the vessel and such water and thereby prevent adhesion of the water to and proportionately increase the speed of the vessel. With this general object in view the invention consists in certain peculiar and novel features of construction and combinations of parts as hereinafter described and claimed; and in order that it may be fully understood, reference is to be had to the accompanying drawing, in which:

Figure 1, is a fragmentary side view of a vessel provided with equipment embodying my invention.

Fig. 2, is a central vertical section of the same.

Fig. 3, is a cross section on the line III—III of Fig. 1, but on a larger scale.

Fig. 4, is an enlarged fragmentary section taken on the dotted line IV of Fig. 1, but showing in elevation the nozzles lying in the plane of said dotted line.

Fig. 5, is a detail perspective view of one of the air spreader discharge nozzles of the equipment.

Fig. 6, is a face view of a valve for controlling the passage of air to the air spreader nozzles for one side of the vessel.

Fig. 7, is a similar view with the valve at a different point of adjustment.

Fig. 8, is a central longitudinal section of the valve in the position it occupies in Fig. 7.

Before proceeding with a description of the invention, it is desired to call attention to the fact that when a vessel of conventional lines is traveling at a speed of about five miles or more per hour, the water cannot follow the convergence of the sides of the rear end of the vessel fast enough to, in effect, glide along such sides as it does at the points where the sides are substantially parallel. On the contrary the water tends to follow a slightly divergent course with respect to the rearwardly converging surfaces of the vessel, that is move away from the vessel, and in attempting to follow such course adheres to and exerts a back pull upon and therefore retards the travel of the vessel. This being true, it is obvious that the speed of the vessel could be accelerated proportionately if such retarding action could be avoided. It is therefore my object specifically stated, to distribute over the surface of the stern of a vessel, a large number of flat air spreader discharge nozzles arranged with their flat faces diverging rearward with respect to the adjacent surface of the vessel, at an angle corresponding substantially to the course naturally followed by the water so that the latter can flow along such surfaces and then beyond them with no material tendency to adhere to them and retard the progress of the vessel.

It is also clear that the speed of travel could be further increased if the water, after clearing the rear ends of the nozzles, could be prevented from coming into contact with the vessel. To accomplish this purpose I provide the vessel with a pair of ventilators or flaring mouthed air pipes which face the wind and are respectively connected to the nozzles at opposite sides of the vessel, so that the water by the relative rapidity of its flow past the nozzles, shall tend to create vacuums in the nozzles and thereby set up circulation of air down through said pipes and said nozzles between the vessel and the water and by keeping the water away from the vessel prevent adhesion thereof to the vessel and undesirable consumption of the propelling power.

My equipment also contemplates the use of independent valves whereby the strength of the air currents separately or together, can be varied or cut off to provide for speed control useful in harbors and for collision emergency and steering purposes.

Referring to the drawing in detail, 1 designates the rear portion of a vessel of conventional or other approved contour, provided with a pair of longitudinal ventilators, each comprising substantially horizontal members 2 and upright swiveled members 3, the latter terminating at their upper or front ends in flaring mouths 4 to face against the wind.

The adjacent ends of said members 2 and 3, respectively fit in openings 5 and 6 in flattened valve casings 7, containing slide valves 8, provided with openings 9, which when the valves are adjusted to open positions, register with and establish communication between the members 2 and 3 of the respective ventilators. Retractile springs 10, are connected to the rear ends of the valves to open the same, and cables 11, extend to the bridge (not shown) of the vessel to enable the navigator to close or partly close either or both of said valves when necessary.

A multiplicity of air pipes 12, extend from each of the ventilator members 2, to openings 13, in the stern walls of the vessel, said openings being spread over that area of the vessel which bears a rearwardly and downwardly converging relation, the topmost of said openings being below the water level and the undermost in lines adjacent opposite sides of the keel of the vessel, and each of said openings 13 communicates with an air distributing discharge nozzle consisting of a flat face plate 14 and side walls 15 which increase in depth from zero at the front end of the plate to the rear end thereof, the inner edges of the walls 15 curving to conform to and fit tightly against the surface of the vessel. The taper of said walls for a part of their length is such that the face plates shall diverge rearwardly with respect to the surface of the vessel at about the line in which the water will naturally flow with the least tendency to adhere to such plates. This statement does not apply at the extreme rear end where the surface of the vessel is substantially transverse of the course traveled, nor in fact, at any parts of the surfaces which converge at a materially greater angle than the angle of divergence between the edges of the walls 15 of the nozzles. On a larger vessel there would be so many nozzles used that it is preferable to standardize them, so that, being interchangeable, no time need be lost by workmen in selecting particular nozzles for securement at special points on the vessel.

With a vessel equipped with my invention, it will be seen that when the valves 8 are open and a fair speed is attained, the tendency of the water to cling by adhesion to the stern and increase in depth at such point as observable from any speeding vessel, creates a suction sufficient to evacuate the water from the nozzles and connected pipes and instantly establish a circulation of air from the ventilators to their respective nozzles. The air jets thus produced, force back the water in their paths and thus destroy its power through adhesive force, to exert a retarding effect on the vessel, it being understood of course, that if sufficient air is thus employed, it will be spread by the water and vessel, and instantly seek the path of least resistance and therefore flow in a thin sheet upwardly against the overhanging submerged surface of the vessel and destroy all tendency of the water to exert a back pull on the vessel. Furthermore the effect of destroying adhesion of the water to the stern portion of the vessel, avoids the banking or welling up of the water to a much greater than normal depth at such point as occurs with any speeding vessel to which the water clings by adhesive force, this increased depth being particularly objectionable in a rough sea, as the propeller is subjected to greater variations of resistance with the rise and fall of the water, than would be encountered if the depth at the propeller was not increased by adhesion of water to the stern of the vessel. By preventing material variation in depth, the vessel moves with greater freedom, ease and speed, under the same power, and the danger of a broken shaft or propeller is minimized.

As the rear end of each nozzle, and the adjacent rearwardly-extending surface portion of the vessel, form in effect a right angle, the water in rushing inward as it clears the rear end of each nozzle, takes a rearwardly-converging path with respect to the said surface of the vessel, and in effect completes a triangle by forming the hypotenuse of said right angle. By this arrangement therefore the water is caused to follow a course which produces a multiplicity of closely associated pockets at the rear ends of said nozzles, and tends consequently to create vacuums in the pockets and nozzles which result in the forced circulation of air from the ventilators down through the various distributing pipes 12 to the respective nozzles 15, as described, and the sheets of air thus discharged, due to the elasticity of the air, will be reduced in thickness or flattened out, so as to spread over a relatively wide area of the vessel. In practice it is contemplated to employ a sufficient number of nozzles to provide sufficient air to practically incase the greater part of the rear portion of the vessel from the water line down, in a thin envelop of air.

In an emergency the speed of the vessel may be reduced quickly by shutting the valves 8 and thereby preventing circulation of air through the ventilators and permitting water to back up into the pipes 12 to the exterior water level, if stationary or moving slowly.

If it be desired to turn the vessel to the right or left, it can be accomplished by closing the right or left hand valve 8, respectively. By closing either valve the water at the corresponding side is permitted to adhere to the vessel in the manner pointed out and thus act at such side as a drag for effecting quick turning movement.

In the event any of the pipes 12 should leak, the controlling valve 16 can be closed to guard against the accumulation of water in the hold of the vessel.

From the above description it will be apparent that I have produced equipment of the character described which possesses the advantageous features enumerated, and I wish it to be understood that while I have illustrated and described what now appears to be the preferred form of the invention, I reserve the right to all changes falling within the spirit and scope of the appended claims.

I claim:

1. A vessel provided at its stern below the water level, with rearwardly-facing nozzles, a pair of large pipes provided with air-receiving ends facing the wind, valves controlling said pipes, a set of small pipes for and connecting said large pipes with the nozzles at a particular side of the vessel, and a valve below the water level, for each of said small pipes.

2. A vessel provided at its stern end below the water level, with rearwardly facing nozzles, a pair of large pipes provided with front ends for facing the wind from any quarter, a valve controlling each pipe, and a set of small pipes connecting each of said first-named pipes with the nozzles at opposite sides of the keel of the vessel.

In testimony whereof I affix my signature.

JOHN ELNIFF.

Copies of this patent may be obtained for five cents each, by addressing the "Commissioner of Patents, Washington, D. C."